United States Patent [19]

Kageyama

[11] Patent Number: 4,776,979

[45] Date of Patent: * Oct. 11, 1988

[54] METAL POWDER-CONTAINING COMPOSITIONS

[75] Inventor: Yoshiteru Kageyama, Yokkaichi, Japan

[73] Assignee: Mitsubishi Petrochemical Company Limited, Tokyo, Japan

[ * ] Notice: The portion of the term of this patent subsequent to Jul. 12, 2004 has been disclaimed.

[21] Appl. No.: 29,242

[22] Filed: Mar. 23, 1987

Related U.S. Application Data

[62] Division of Ser. No. 823,789, Jan. 29, 1986, Pat. No. 4,680,140.

[30] Foreign Application Priority Data

Jan. 31, 1985 [JP]  Japan .................................. 60-17216
Jan. 31, 1985 [JP]  Japan .................................. 60-17217

[51] Int. Cl.$^4$ ............................................. H01B 1/06
[52] U.S. Cl. .................................... 252/512; 252/513; 252/518; 252/519; 252/510; 252/511; 427/216; 428/405; 428/407; 524/439; 524/440; 523/457; 523/458; 523/459

[58] Field of Search ............... 252/512, 513, 511, 510, 252/518, 519; 427/216, 219, 220; 428/403, 405, 407; 523/457–459

[56] References Cited

U.S. PATENT DOCUMENTS 4,579,882  4/1986  Kanabe ............................ 252/513

Primary Examiner—Josephine Barr
Attorney, Agent, or Firm—Oblon, Fisher, Spivak, McClelland & Maier

[57] ABSTRACT

A metal powder-containing polymer composition selected from the group consisting of

[A] polymer compositions each containing a metal powder having an amino compound and a silane coupling agent compound deposited thereon; and

[B] compositions each consisting essentially of:
   (a) powder of a metal having an amino compound or a mixture of an amino compound and a silane coupling agent compound deposited thereon and
   (b) a thermoplastic resin comprising a carboxyl group-containing thermoplastic resin.

The amine compound is exemplified by diamine compounds; the silane coupling agent by aminosilane compounds and vinyl silane compounds; and the polymer by a blend of a maleic anhydride-graftpolymerized polypropylene and polyester, polyamide or polypropylene.

14 Claims, No Drawings

METAL POWDER-CONTAINING COMPOSITIONS

This is a division, of application Ser. No. 823,789, filed Jan. 29, 1986 now U.S. Pat. No. 4,680,140.

BACKGROUND OF THE INVENTION

1. Field of the Art

This invention relates to a polymer composition containing modified metal powder. More particularly, it relates to an improvement in anti-oxidizing stability of a metal powder-blended polymer.

A metal powder-blended polymer is provided with the properties peculiar to the metal such as electroconductive or magnetic properties and thus can be applied to a variety of uses utilizing these properties.

2. Prior Art

Conventional metal powder-blended polymer compositions, especially polymer compositions blended with iron or iron alloy powder, are readily oxidized and often rust when practically used because a metal powder is generally more chemically active than metal articles. Such rusting lowers the electroconductive and magnetic properties of a metal, and even a small degree of rusting sometimes lowers the commercial values of products because of poor appearances.

To deal with such problems, methods for improving the anti-oxidizing stability have been proposed. Examples of such methods are a method of covering the surfaces of metal powder with an organic rust-resisting agent (e.g., Publn. Nos. of Unexamined Pat. Applications 63494/76, 8798/78 and 77270/79), a method of using alloy powder (Japanese Laid-Open Patent Application No. 7153/71 Specification), a method of oxidizing and covering the surfaces with dense metal oxide layers (e.g., Publn. No. of Unexamined Patent Application 147502/83), and a method of chromate treatment. Even by the use of the metal powder treated according to these rust-preventing methods, however, long-term anti-oxidizing stabilities required for such metal powder-containing compositions have not been fully satisfactory, and further improvement has been demanded.

SUMMARY OF THE INVENTION

An object of the present invention is to solve the above mentioned problems by the use of metal powder having an amine compound and a silane coupling agent deposited tghereon, or by the use of both a metal powder treated with an amine compound or the like and a carboxyl-containing thermoplastic resin as the thermoplastic resin.

Thus, there is provided a metal powder-containing polymer composition selected from the group consisting of

[A] polymer compositions each containing a metal powder having an amino compound and a silane coupling agent compound deposited thereon and

[B] compositions each consisting essentially of:
  (a) powder of a metal having an amino compound or a mixture of an amino compound and a silane coupling agent compound deposited thereon, and
  (b) a thermoplastic resin comprising a carboxyl group-containing thermoplastic resin.

EFFECTS

The present composition has overcome the above mentioned problems by a synergistic action of the amine compound and the silane coupling agent compound deposited on a metal powder, or by the amine compound or the like deposited on a metal powder and the carboxyl-containing thermoplastic resin.

The former composition [A] according to the present invention exhibits greater anti-rusting action than the compositions wherein the amine compound alone or the silane coupling agent compound alone is used. The latter composition [B] according to the present invention is based on the technical concept wherein the rust-preventing functions are supported by the modified thermoplastic resin used as the matrix in addition to the amine compound, which is different from that of the prior art because the prior art was essentially directed to the rust-prevention treatment of metal powder. Moreover, it has never been anticipated over the prior art that the above mentioned problems can be solved by the specified combination of rust-preventing materials (i.e., the amine compound or the like and the carboxyl-containing thermoplastic resin).

Also, it has been unexpectedly found that the impact strength of the present composition can be markedly enhanced by the combined used of the metal powder having the amine compound or the like deposited thereon and the thermoplastic resin comprising a carboxyl-containing thermoplastic resin because it is generally known in the art that a resin composition containing a high content of metal powder has markedly low impact strength, and thus the practical uses thereof have been much restricted.

DETAILED DESCRIPTION OF THE INVENTION

The composition according to the present invention is essentially a blended (or compounded) composition of a metal powder and a polymer.

Metal Powder

The metal powder to be used in the present invention essentially is not different from the metal powder used or possibly used in the aforementioned prior art except that it has an amine compound, or the like deposited thereon. Specific examples are powders of metals such as iron, cobalt, nickel, copper, chromium, zinc and tin; powders of alloys of these metals; powders of alloys of a major amount of the metal and a minor amount of another metal; and mixtures thereof. The term "metal powders" herein encompasses powders having oxide layers of the metal or another metal on the surfaces thereof, powders having chromate-treated layers on their surfaces, and powders having metal-plated layers on their surfaces. With respect to metal species, iron having a variety of carbon contents (inclusive of zero) and alloys containing a major amount of iron are advantageously used in the present invention from the viewpoint of rust prevention and magnetic or electroconductive properties.

There is essentially no difference between the particle size of the metal powder and that of the powder used or possibly used in the prior art. For example, the mean particle size of the metal powder is in the range of 0.01 to 100 microns.

The metal powder can be produced by suitable methods such as a method of pyrolytically decomposing a metal carbonyl, a method of spraying molten metal, a method of reducing a metal oxide, and other conventional methods.

Amine Compounds

One of the features of the present invention is to deposit or bond an amine compound or an amine compound and a silane coupling agent onto the above mentioned metal powder.

Suitable amine compounds to be used in the present invention include higher aliphatic amines, aromatic amines, higher aliphatic heterocyclic amines, and derivatives thereof.

A suitable higher aliphatic amine has a linear or branched aliphatic chain of 6 to 22 carbon atoms bonded to nitrogen atom. Use is made of a primary amine as well as a secondary amine and a tertiary amine. These amines may be in the form of their salts with organic or inorganic acids.

Examples of these primary amines include hexyl amine, isohexyl amine, heptyl amine, octyl amine and pentadecyl amine. Examples of these secondary amines include dihexyl amine, dinonyl amine, ditridecyl amine, diotadecyl amine, etc. Examples of these tertiary amines include trihexyl amine, trioctyl amine and dimethyloctadecyl amine.

A suitable aromatic amine to be used in the present invention has at least one aromatic hydrocarbon group, preferably phenyl or alkylphenyl, bonded to nitrogen atom. Use is made of a primary amine as well as a secondary amine and a tertiary amine. Examples of these primary amines include aniline, toluidine, and propylanilline. Examples of these secondary amines include N-methyl aniline, N-ethyl aniline and N-ethyl toluidine. Examples of these tertiary amines include N-methyl diphenyl amine and triphenyl amine.

The amines can be the derivatives thereof as long as the derivative functions as an amine. Useful as such derivatives higher aliphatic amines and aromatic amines are a oxyalkylene (especially ethylene and/or propylene oxide) amine wherein a portion of the hydrogen atoms or aliphatic groups bonded to the amine group has been substituted with an oxyalkylene (especially ethylene and/or propylene oxide) having about 2 to 4 carbon atoms; and an N-alkylaminocarboxylic acid amide wherein the above-mentioned portion has been substituted with an aliphatic carboxylic acid having about 2 to 6 carbon atoms.

The higher aliphatic heterocyclic amines and derivatives thereof include, for example, a nitrogen-containing five-member cyclic compound having an aliphatic chain of 6 to 22 carbon atoms, as well as an alkylene (especially ethylene and/or propylene) oxide adduct thereof, and a salt thereof with an organic or inorganic acid. Useful are the derivatives of the amines wherein the hydrogen atom of imine group has been substituted with an alkyl amine, an alcohol, a carboxylic acid, an amide or the like having a relatively lower (preferably $C_1$ to $C_6$) alkyl moiety. Examples of these amines include alkyl pyrrole such as 4-octyl pyrrole and 3-pentadecyl pyrrole. Alkyl imidazole such as 3-heptyl imidazole and 3-octyl imidazole, and alkylimidazoline such as 3-tridecyl imidazoline.

These amine compounds also include diamine compounds. Diamine compounds suitable for use in the present invention are the derivatives of the above-mentioned primary or secondary amines wherein the hydrogen atom has been substituted with the group having the formula H₂NR— in which R is an aromatic hydrocarbon group or aliphatic hydrocarbon group having 1 to 10 carbon atoms. Examples of such diamines include dioctylamino-pentylamine, stearylpropylene-diamine, and di-β-naphthyl-p-phenylenediamine. Of these amine compounds, especially preferred are diamine compounds.

The quantity of the amine to be used is shown below.

Silane Coupling Agent

The silane coupling agent compounds to be used in the present invention are typically represented by the general formula $R^1R^2_nSi(OR^3)_{3-n}$, wherein: n is zero or 1; $R^1$ is an amino, mercapto, vinyl, epoxy or methacryloxy group; and each of $R^2$ and $R^3$ is a saturated hydrocarbon group having 1 to 6 carbon atoms or ether group. Examples of these compounds include vinyl silane compounds such as vinyltrimethyoxy- and vinyltriethoxysilane, and vinyl-tri(2-methoxyethoxy)silane; aminosilane componds such as γ-aminopropyltrimethoxysilane and N-β-(aminoethy)γ-aminopropyltrimethoxysilane; and epoxysilane compounds such as γ-glycidoxypropyltrimethoxysilane and β-(3,4-epoxycyclohexyl) ethyltrimethoxysilane. Of these silane compounds, especially, preferred are vinyl silane compounds and aminosilane compounds.

The quantity of the silane coupling agent compounds to be used is shown below.

Treatment of Metal Powder

The quantity of the amine compound or the silane coupling agent to be used alone is generally in the range of 0.05 to 2.0%, preferably in the range of 0.2 to 1.5% by weight of the metal powder, respectively. When the silane coupling agent and amine compound are used in combination, the quantity of the silane coupling agent is in the range of 0.01 to 2.0%, preferably 0.05 to 1.0%, and that of the amine compound is in the range of 0.01 to 2.0%, preferably 0.05 to 1.0% by weight of the metal powder.

The most useful method for depositing the amino compound, etc. on the metal powder comprises dissolving the amino compound alone or together with the silane coupling agent in an inert solvent such as n-heptane or toluene, wetting or soaking the metal powder with the resulting solution at room temperature or under heating to sufficiently deposit the amino compound, etc. onto the metal powder, and then removing the solvent by filtration or the like followed by drying. The deposition can also be conducted by a dry blend method by means of a super mixer or the like. Also, in the above mentioned wet deposition method using an amine compound solution, a thermoplastic resin can be used instead of the liquid solvent such as n-heptane. In other words, a thermoplastic resin blended with the amine compound, etc. can be used in a molten state instead of the solution.

Polymers

The matrix polymer holding the metal powder treated as in the above mentioned method in a dispersed state is a synthetic resin or (and) a synthetic rubber in the case of the composition [A]. The synthetic resin can be either thermoplastic or thermosetting. The polymer can also have optional plastic or rubber-elastic properties between resins and rubbers. All these polymers can be used as the polymer component in the present composition.

A preferred group of the synthetic resins is a thermoplastic resin. More specifically, such thermoplastic resins include poly-α-olefins such as polyethylene (low density, high density, and linear low density type), polypropylene, and propylene-ethylene block- or random copolymer; styrene resins such as polystyrene, acrylonitrile-butadiene-styrene terpolymer, styrene-butadiene blockcopolymer, and hydrogenated polymers thereof; acrylic resins such as poly(methyl methacrylate); polyvinyl halide resins such as polyvinyl chloride; polyamide resins such as nylon 6 and nylon 66; saturated polyester resins such as polyethylene terephthalate and polybutylene terephthalate; polyether resins such as polyphenylene oxide; polysulfone; polyphenylenesulfide; polyvinylidene fluoride; polytetrafluoroethylene; α-olefin-vinyl monomer copolymers such as ethylene-vinyl acetate copolymer and ethylene-acrylic acid copolymer; acid-modified resins such as maleic anhydried-modified polypropylene; and mixtures thereof.

The thermosetting resins include, for example, epoxy resin, phenol resin, unsaturated polyester resin, melamine resin, polyurethane resin, and mixtures thereof.

The synthetic rubbers include, for example, ethylene-propylene rubber, styrene-butadiene rubber, isoprene rubber, chloroprene rubber, silicone rubber, and mixtures thereof.

These polymers to be used in the present polymer composition are selected to satisfy the demanded properties.

Incidentally, the carboxyl-containing resin defined below for the component (b) of the composition [B] can also be used in the present composition [A].

The term "carboxyl-containing thermoplatic resin" to be used in the present composition [B] means a polymer and especially a copolymer of an ethylenically unsaturated monomer containing a carboxyl group, as well as a copolymer obtained by heating a thermoplastic resin and a carboxyl-containing ethylenically unsaturated monomer in the presence of a radical polymerization initiator (hereinafter referred to as graft polymer). The latter graft polymer is generally preferred.

The term "carboxyl group" herein means a free carboxyl gruop (—COOH) as well as anhydric group thereof (especially in the case of a dibasic acid) and a salt thereof, wherein the former two groups are preferred. The "salt" may be a salt formed by neutralization of a free carboxyl group or hydrolysis of an ester. The "thermoplastic resin comprising carboxyl-containing thermoplastic resin" herein means a composition obtained by intentionally mixing the above mentioned copolymeric or graft-polymeric product with the same or different untreated thermoplastic resin, as well as an incomplete copolymerization product containing some non-copolymeric or non-grafted resin obtained by the use of a relatively small amount of a monomer for copolymerization or graft-polymerization. The former mixture is preferred.

Typical examples of the unsaturated carboxylic acids or the derivatives thereof for copolymerization or graft-polymerization include a monobasic carboxyic acid having not more than 10 carbon atoms and at least one double bond (e.g., acrylic acid and methacrylic acid), as well as a dibasic carboxylic acid having not more than 15 carbon atoms and at least one double bond (e.g., maleic acid), and anhydried of the dibasic acid (e.g., maleic anhydride, 5-norbornene-2,3-dicarboxylic acid anhydride). Of these unsaturated carboxylic acids and derivatives thereof, especially preferred are maleic acid and maleic anhydride.

As mentioned above, the carboxyl-containing thermoplastic resin is obtained by treating a thermoplastic resin with an unsaturated carboxylic acid or a derivative thereof in the presence of a radical polymerization initiator (preferably an organic peroxide).

The thermoplastic resins to be used in the preparation of such modified thermoplastic resins include, for example, polyethylene (low density, high density, linear low density types); polypropyrene; styrene resins such as polystyrene, styrene-butadiene block copolymer and a hydrogenated product thereof; polyamide resins such as nylon 6; saturated polyester resins such as polybutyrene terephthalate; and polyether resins such as polyphenylene oxide and polyvinylidene fluoride. Of these modified resins, preferred is a modified polyolefin resin. A conventional graft polymerization process is used for the modification. In general, such a modification process comprises blending a mixture of the components at the decomposition temperature or higher temperature of a radical polymerization initiator used.

In a preferred embodiment of the present invention, the thermoplastic resins to be incorporated into the modified thermoplastic resin mentioned above include, for example, poly-α-olefins such as polyethylene, polypropylene, and propylene-ethylene block- or random copolymer; styrene resins such as polystyrene, acrylonitrile-butadiene-styrene terpolymer, and hydrogenated polymers thereof; acrylic resins such as poly(methyl methacrylate); polyvinyl halide resins such as polyvinyl chloride; polyamide resins such as nylon 6; saturated polyester resins such as polyethylene terephthalate; polyether resins such as polyphenylene oxide; polysulfone; polyphenylenesulfide; polyvinylidene fluoride; and polytetrafluoroethylene.

These thermoplastic resins may be the same as or different from the thermoplastic resins used for the preparation of the modified thermoplastic resins. These thermoplastic resins are selected so as to meet the properties of the objective products.

The content of the carboxyl group in "the thermoplastic resin comprising the carboxyl-containing thermoplastic resin" (i.e., the component (b) of the present composition) is approximately in the range of 0.01 to 15% by weight. As mentioned above, the component (b) preferably comprises the modified thermoplastic resin and the non-modified thermoplastic resin. In this case, the ratio by weight of the modified thermoplastic resin to the non-modified thermoplastic resin is 1:from 3 to 0.1, preferably 1:from 1 to 0.2.

COMPOSITIONS

The composition of the present invention comprises a polymer blended with metal powder on which an amine compound, etc. has been deposited.

The ratio to be added of the above mentioned chemical species-deposited metal powder to the polymer is from 10 to 70 parts by volume per 100 parts by volume of the polymer. The "volume" herein means a true volume, which can be calculated from the corresponding density and weight.

In order to further enhance the electroconductive or magnetic properties and the like of the present polymer composition, electroconductive powder such as carbon black and graphite or magnetic metal oxide powder such as ferrite can be added into the polymer in addition to the above mentioned metal powder.

The present polymer composition can be obtained by means of a batch-wise kneader such as a Banbury mixer, rollers and Brabender plastograph, as well as a continuous extruder such as monoaxial or biaxial extruder. The sequence of blending is not especially restricted. For example, all the materials can be blended and then kneaded, or some parts of the materials can be kneaded and then the resulting blend can be kneaded with the remaining parts of the materials.

The present polymer composition can be used for antistatic materials or electromagnetic wave-shielding materials which require electroconductivity, as well as for magnetic field-shielding materials, electromagnetic wave-absorbing materials and plastic magnets which require magnetic properties.

EXPERIMENTAL EXAMPLES

Example 1

Preparation of amine-deposited metal powder

Two (2) kgs of carbonyl iron powder (mean particle size 3 microns) available on the market was placed in 1 liter of an n-heptane solution of 4 g γ-aminopropyltrimethoxysilane and 8 g of dicyclohexylamine dissolved therein. The mixture was subjected to stirring in air at 50° C. for 1 hour, followed by filtration and drying. Thus carbonyl iron powder on which the compounds were deposited was obtained.

Production of the composition

30% by volume of the carbonyl iron powder thus treated and 70% by volume of polypropylene were blended, kneaded in a biaxial extruder, and then pelletized. The resulting pellets were compression-molded into a 2-mm-thick sheet. The specific volume resistance of the sheet was $3 \times 10^3$ ohm.cm. In an accelerated corrosion test, the sheet was placed in an atmosphere of a relative humidity (RH) of 90% and 60° C. for 80 days. The specific volume resistance of the treated sheet was $4 \times 10^3$ ohm.cm, which showed no substantial change. The state of corrosion was checked by X-ray diffraction and optical microscopy. No corrosion was observed.

Comparative Example 1

The treatment of metal powder in Example 1 was repeated except that dicyclohexylamine was not added. The sheet was obtained in the same way as in Example 1 using the metal powder thus heated, which showed a specific volume resistance of $1 \times 10^3$ ohm.cm.

As a result of the accelerated corrosion test of the resulting sheet, red rust was observed on the surfaces thereof, and also broad peaks based on $Fe(OH)_3$ appeared in the vicinity of $2\theta = 35°$ on the X-ray diffraction patterns thereof. The specific volume resistance of the sheet thus treated was changed to $2 \times 10^9$ ohm.cm.

Comparative Example 2

The treatment of metal powder in Example 1 was repeated except that γ-aminopropyltrimethoxysilane was not added. The sheet was obtained in the same way as in Example 1 by using the metal powder thus treated, which showed a specific volume resistance of $2 \times 10^3$ ohm.cm.

As a result of the accelerated corrosion test of the sheet, red rust was observed as in Comparative Example 1 on the surfaces thereof, and also broad peaks appeared in the vicinity of $2\theta = 35°$ on the X-ray diffraction patterns thereof. The specific volume resistance of the sheet thus treated was changed to $1 \times 10^7$ ohm.cm.

Examples 2 through 5

The treatment of metal powder in Example 1 was repeated by using a silane coupling agent and an amine compound shown in Table 1 instead of the amine compound and γ-aminopropyltrimethoxysilane used in Example 1. Sheets were obtained by using the metal powder thus treated in the same way as in Example 1. The results of accelerated corrosion tests of the sheets and the specific volume resistance values of the treated sheets are shown in Table 1.

TABLE 1

| Examples | Silane coupling agents Types | Quantity (g) | Amine compounds Types | Quantity (g) | Corroded products | Specific volume resistance of corrosion-treated sheets (ohm · cm) |
|---|---|---|---|---|---|---|
| Ex. 2 | vinyl-tris(2-methoxy-ethoxy)silane | 4 | phenyl-α-naphthylamine | 8 | none | $5 \times 10^3$ |
| Ex. 3 | N—β-(aminoethyl)-γ-amino-propyl-triethoxy-silane | 4 | di-β-naphthyl-p-phenylenediamine | 8 | none | $4 \times 10^3$ |
| Ex. 4 | N—β-(aminoethyl)-γ-amino-propyl-triethoxy-silane | 4 | dioctylamino-pentylamine | 8 | none | $4 \times 10^3$ |
| Ex. 5 | γ-aminopropyl-trimethoxysilane | 4 | stearylpropylene-diamine | 8 | none | $6 \times 10^3$ |

Example 6

Preparation of amine-deposited magnetic powder

Two (2) kgs. of carbonyl iron powder (mean particle size 3 microns) available on the market was placed in 1 liter of an n-heptane solution of 5 g γ-aminopropyltrimethoxysilane and 3 g dicyclohexylamine dissolved therein. The mixture was subjected to stirring in air at 50° C. for 1 hour, followed by filtration and drying. Thus carbonyl iron powder on which the compounds were deposited was obtained.

Production of the composition

30% by volume of the carbonyl iron powder thus treated and 40% by volume of polypropylene modified with maleic anhydride (maleic acid content 0.8% by weight) and non-modified polypropylene 30% by volume were blended, kneaded in a biaxial extruder, and then pelletized. The resulting pellets were compression-molded into a 2 mm thick sheet. The specific volume resistance of the sheet was $4 \times 10^3$ ohm.cm. The properties of the resulting pellets are shown in Table 3.

In an accelerated corrosion test, the sheet was placed in an atmosphere of a relative humidity (RH) of 90% and 60° C. for 150 days. The specific volume resistance of the treated sheet was $6 \times 10^3$ ohm.cm, which showed no substantial change. The state of corrosion was checked by X-ray diffraction and optical microscopy. No corrosion was observed.

Comparative Example 3

The production of the composition in Example 6 was repeated by using carbonyl iron powder having no silane coupling agent and no amine compound deposited thereon instead of the deposited powder to obtain the corresponding compression-molded sheet. The specific volume resistance of the resulting sheet was $1 \times 10^3$ ohm.cm. The properties of the resulting composition are shown in Table 3.

As a result of the corrosion test described in Example 6, about 12% of corroded products were observed on the surfaces of the sheet. The specific volume resistance of the sheet was changed to $7 \times 10^6$ ohm.cm after the corrosion test.

Comparative Example 4

The production of the composition in Example 6 was repeated by using 70% by volume of non-modified polypropylene instead of using the modified polypropylene to obtain the corresponding compression-molded sheet. The specific volume resistance of the resulting sheet was $4 \times 10^3$ ohm.cm. The properties of the resulting composition are shown in Table 3.

As a result of the corrosion test described in Example 6, corroded products were observed on almost all of the surfaces of the sheet. The specific volume resistance of the sheet was changed to $8 \times 10^9$ ohm.cm after the corrosion test.

Examples 7 through 11

The treatment of magnetic powder in Example 6 was repeated by using a silane coupling agent and an amine compound shown in Table 2 instead of the amine compound and γ-aminopropyltrimethoxysilane used in Example 6. Sheets were obtained by using the metal powder thus treated in the same way as in Example 6. The results of accelerated corrosion tests of the sheets and the specific volume resistance values of the treated sheets are shown in Table 2. Also, the properties of the resulting compositions are shown in Table 3.

TABLE 3

| Examples | Bending modulus*1 Kg/cm$^2$ | Bending stress*2 Kg/cm$^2$ | Izod impact strength*3 (with notch) Kg-cm/cm |
|---|---|---|---|
| Ex. 6 | 32,400 | 520 | 17.3 |
| Comp. Ex. 3 | 35,300 | 390 | 3.7 |
| Comp. Ex. 4 | 30,800 | 370 | 3.3 |
| Ex. 7 | 71,500 | 980 | 12.2 |
| Ex. 8 | 86,800 | 850 | 12.7 |
| Ex. 9 | 34,000 | 490 | 16.0 |
| Ex. 10 | 34,400 | 480 | 14.0 |
| Ex. 11 | 35,300 | 390 | 4.0 |

Measurements according to
*1JIS K7203
*2JIS K7203,and
*3JIS 7110.

What is claimed is:

1. A metal powder-containing polymer composition comprising a polymer containing a metal powder having an amino compound and a silane coupling agent compound deposited thereon, the mean particle size of the metal powder being in the range of 0.01 to 100 microns and the ratio of the deposited metal powder to be added to the polymer being from 10 to 70 parts by volume per 100 parts by volume of the polymer.

2. The composition according to claim 1, in which the metal powder is the powder of metal selected from the group consisting of iron, cobalt, nickel, copper, chrominum, zinc, tin, alloys of these metal species, alloys of a major amount of these metal species and a minor amount of other metals, and mixtures thereof.

3. The composition according to claim 2, in which the metal is selected from the group consisting of iron and iron alloys containing a major amount of iron.

4. The composition according to claim 1 in which the amine compound is selected from the group consisting of amines each having a linear or branched aliphatic group of 6 to 22 carbon atoms bonded to nitrogen atom, an acid adduct salt thereof, an ethylene oxide and/or propylene oxide adduct thereof, and an N-alkylamine carboxylic acid substituted with a $C_2$–$C_6$ aliphatic carboxylic acid;

amines each having at least one aromatic hydrocarbon group bonded to nitrogen atom, an acid adduct

TABLE 2

| Examples | Chemical species deposited Silain coupling agents | Amine compounds | Modified thermoplastic resins | Thermoplastic resins | State of rusting | Specific volume resistance after corrosion test (ohm · cm) |
|---|---|---|---|---|---|---|
| Ex. 7 | γ-aminopropyl-trimethoxysilane | dicyclohexyl-amine | polypropylene modified with maleic anhydride | polybutyrene terephthalate | not at all | $4 \times 10^3$ |
| Ex. 8 | γ-aminopropyl-trimethoxysilane | dicyclohexyl-amine | polypropylene modified with maleic anhydride | nylon-6 | not at all | $8 \times 10^3$ |
| Ex. 9 | γ-aminopropyl-trimethoxysilane | stearylpropylene-diamine | polypropylene modified with maleic anhydride | polypropylene | not at all | $2 \times 10^3$ |
| Ex. 10 | vinyl-tris(2-methoxyethoxy)-silane | phenyl-α-naphtylamine | polypropylene modified with maleic anhydride | polypropylene | not at all | $3 \times 10^3$ |
| Ex. 11 | not used | dioctylamino-pentylamine | polypropylene modified with maleic anhydride | polypropylene | not at all | $3 \times 10^4$ | salt thereof, an ethylene oxide and/or propylene oxide adduct thereof;

alkyl imidazolines, alkyl imidazoles, alkyl oxazolines, each having an alkyl group of 6 to 22 carbon atoms, an ethylene oxide and/or propylene oxide adduct thereof, and an acid adduct salt thereof; and diamines wherein the hydrogen atom of said amines has been substituted with a group having the formula H$_2$NR— in which R is aromatic hydrocarbon radical or aliphatic hydrocarbon radical of 1 to 10 carbon atoms.

5. The composition according to claim 4, in which the amine compound is a diamine compound.

6. The composition according to claim 1, in which the silane coupling agent compound is represented by the formula R$^1$R$^2{}_n$Si(OR$^3$)$_{3-n}$, wherein: n is zero or 1; R$^1$ is amino, mercapto, vinyl, epoxy or methacryloxy group; and each of R$^2$ and R$^3$ is a saturated hydrocarbon group having 1 to 6 carbon atoms or an ether group.

7. The composition according to claim 6, in which the silane coupling agent is selected from the group consisting of vinyl silane compounds and aminosilane compounds.

8. The composition according to claim 1, in which the metal powder having the amine compound or the amine compound and silane coupling agent compound deposited thereon is obtained by causing a solution of the former to contact the metal powder and then removing the solvent used.

9. The composition according to claim 8, in which in the case where only the amine compound is deposited on the metal powder, the quantity of the amine compound is 0.05 to 2.0% by weight of the metal powder.

10. The composition according to claim 8, in which, in the case where both the amine compound and silane compound are deposited on the metal powder, the quantities of said compounds are 0.01 to 2.0% and 0.01 to 2.0%, respectively, by weight of the metal powder.

11. The composition according to claim 1, in which the polymer is a thermoplastic synthetic polymer.

12. The composition according to claim 11, in which the thermoplastic synthetic polymer is a thermoplastic synthetic resin.

13. The composition according to claim 1, in which the polymer is a thermosetting synthetic resin.

14. The composition according to claim 1, in which the polymer is a synthetic rubber.

* * * * *